(12) United States Patent
Gutnik et al.

(10) Patent No.: US 9,152,366 B2
(45) Date of Patent: Oct. 6, 2015

(54) REMOTE PRINTING MANAGEMENT FOR CLOUD PRINTING

(71) Applicant: GOOGLE INC., Mountain View, CA (US)

(72) Inventors: Yevgeniy Gutnik, Cupertino, CA (US); Albert Bodenhamer, San Jose, CA (US); Sanjeev Radhakrishnan, San Jose, CA (US); Abhijit Kalamkar, Sunnyvale, CA (US); Yuri Dolgov, Mountain View, CA (US); Paolo Ferraris, Mountain View, CA (US); Scott Byer, Cupertino, CA (US); Tyler Odean, San Francisco, CA (US); Marc Pawliger, San Jose, CA (US); Robert Toscano, San Francisco, CA (US); Akshay Kannan, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/755,464

(22) Filed: Jan. 31, 2013

(65) Prior Publication Data

US 2015/0199161 A1    Jul. 16, 2015

Related U.S. Application Data

(60) Provisional application No. 61/600,452, filed on Feb. 17, 2012.

(51) Int. Cl.
*G06F 15/00* (2006.01)
*G06F 3/12* (2006.01)

(52) U.S. Cl.
CPC .................................. *G06F 3/1296* (2013.01)

(58) Field of Classification Search
None
See application file for complete search history.

(56) References Cited

U.S. PATENT DOCUMENTS

| 5,828,864 | A | 10/1998 | Danknick et al. |
|---|---|---|---|
| 6,453,129 | B1 | 9/2002 | Simpson et al. |
| 7,092,119 | B1 | 8/2006 | Hinds et al. |
| 7,411,690 | B2 | 8/2008 | Tsukada et al. |
| 2004/0114175 | A1* | 6/2004 | Cherry et al. ................ 358/1.15 |
| 2005/0158100 | A1 | 7/2005 | Yamaguchi |
| 2006/0095500 | A1 | 5/2006 | Kato |

(Continued)

FOREIGN PATENT DOCUMENTS

| EP | 1465052 A2 | 10/2004 |
|---|---|---|
| WO | 2011115987 A2 | 9/2011 |

OTHER PUBLICATIONS

"Server Message Block", from Wikipedia, the free encyclopedia, Aug. 24, 2012, 9 pages.

(Continued)

*Primary Examiner* — Helen Q Zong
(74) *Attorney, Agent, or Firm* — Brake Hughes Bellermann LLP

(57) ABSTRACT

A print server may include an application manager configured to receive a print job from a user and associate the print job with a printer. The print server may include a presence manager configured to provide a presence code for the print job and the printer, and to receive the presence code from the user in conjunction with a physical presence of the user at the printer, and a print job router configured to release the print job for printing by the printer, based on the receipt of the presence code.

16 Claims, 5 Drawing Sheets

(56) References Cited

U.S. PATENT DOCUMENTS

| | | | |
|---|---|---|---|
| 2006/0158680 A1 | 7/2006 | Fujinawa et al. | |
| 2007/0086054 A1 | 4/2007 | Ikeno | |
| 2007/0159650 A1 | 7/2007 | Takamatsu et al. | |
| 2007/0253020 A1 | 11/2007 | Hull et al. | |
| 2008/0137121 A1 | 6/2008 | Chrisop et al. | |
| 2008/0155152 A1* | 6/2008 | Keeney et al. | 710/220 |
| 2009/0276266 A1 | 11/2009 | Nishiyama | |
| 2010/0171973 A1* | 7/2010 | Kimura | 358/1.15 |
| 2010/0302579 A1 | 12/2010 | Nuggehalli et al. | |
| 2010/0309508 A1 | 12/2010 | Kamath et al. | |
| 2010/0328707 A1 | 12/2010 | Miyake | |
| 2011/0075164 A1 | 3/2011 | Nordback | |
| 2011/0096354 A1 | 4/2011 | Liu | |
| 2011/0222104 A1 | 9/2011 | Mohammad et al. | |
| 2011/0235085 A1* | 9/2011 | Jazayeri et al. | 358/1.14 |
| 2011/0242554 A1 | 10/2011 | Farry et al. | |
| 2011/0299110 A1 | 12/2011 | Jazayeri | |
| 2012/0057193 A1 | 3/2012 | Jazayeri | |
| 2013/0070288 A1* | 3/2013 | Muranaka | 358/1.15 |
| 2013/0107312 A1* | 5/2013 | Venkatesh | 358/1.15 |
| 2013/0155441 A1* | 6/2013 | Hong et al. | 358/1.14 |
| 2013/0265602 A1* | 10/2013 | Mykins et al. | 358/1.14 |

OTHER PUBLICATIONS

"Cups", from Wikipedia, the free encyclopedia, Aug. 22, 2012, 10 pages.

"HP and RIM Announce Strategic Alliance to Mobilize Business on BlackBerry", Hewlett-Packard Development Company, L.P., May 4, 2009, 3 pages.

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

Internet Printing Protocol. from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Non-Final Office Action for U.S. Appl. No. 12/725,067, mailed Sep. 27, 2012, 17 pages.

"Public-Key Cryptography", from Wikipedia, the free encyclopedia, Aug. 24, 2012, 12 pages.

* cited by examiner

REMOTE PRINTING MANAGEMENT FOR CLOUD PRINTING

CROSS REFERENCE TO RELATED APPLICATION

This application is a nonprovisional of, and claims priority to, U.S. Provisional Patent Application No. 61/600,452, filed on Feb. 17, 2012, entitled "REMOTE PRINTING MANAGEMENT FOR CLOUD PRINTING", the disclosure of which is hereby incorporated by reference in its entirety.

TECHNICAL FIELD

This description relates to remote printing.

BACKGROUND

Cloud printing provides users with an ability to print content from virtually any application or device, using any authorized and capable printer. Consequently, users may be provided with previously-unavailable or infeasible options for printing content.

For example, users, or an entire class of users, may gain access to a large number and variety of printers, e.g., public printers. With access to such printing resources, some users may utilize the printing resources in a wasteful, unauthorized, or otherwise undesirable fashion.

For example, some users may print documents to remote printers, but may then neglect to actually retrieve the printed documents, so that the printer paper and other printing resources are wasted. In other examples, users may attempt to send mass printings to one or more printers, e.g., as part of an unsolicited marketing campaign. Such printings, in addition to being a wasteful and inefficient use of printing resources, may be an annoyance to the owner/provider of the printers, as well as to other, legitimate users.

Thus, in these and other scenarios, the features and advantages of cloud printing platforms may potentially be utilized in a manner that is inefficient at best, and malicious at worst. Consequently, adoption and use of cloud printing platforms and related technologies may be impeded, and enjoyment thereof may be lessened.

SUMMARY

According to one general aspect, a print server may include instructions stored on a computer-readable medium and executable by at least one processor. The print server may include an application manager configured to cause the at least one processor to receive a print job from a user and associate the print job with a printer. The print server may include a presence manager configured to cause the at least one processor to provide a presence code for the print job and the printer, and to receive the presence code from the user in conjunction with a physical presence of the user at the printer, and a print job router configured to cause the at least one processor to release the print job for printing by the printer, based on the receipt of the presence code.

According to another general aspect, a method may include receiving a print job from a user, associating the print job with a printer, and providing a presence code for the print job and the printer. The method may further include receiving the presence code from the user in conjunction with a physical presence of the user at the printer, and releasing the print job for printing by the printer, based on the receipt of the presence code.

According to another general aspect, a computer program product may be tangibly embodied on a computer-readable storage medium and may include executable code that, when executed, is configured to cause a data processing apparatus to receive a print job from a user, associate the print job with a printer, provide a presence code for the print job and the printer, receive the presence code from the user in conjunction with a physical presence of the user at the printer, and release the print job for printing by the printer, based on the receipt of the presence code.

The details of one or more implementations are set forth in the accompanying drawings and the description below. Other features will be apparent from the description and drawings, and from the claims.

DETAILED DESCRIPTION

Figure 1:
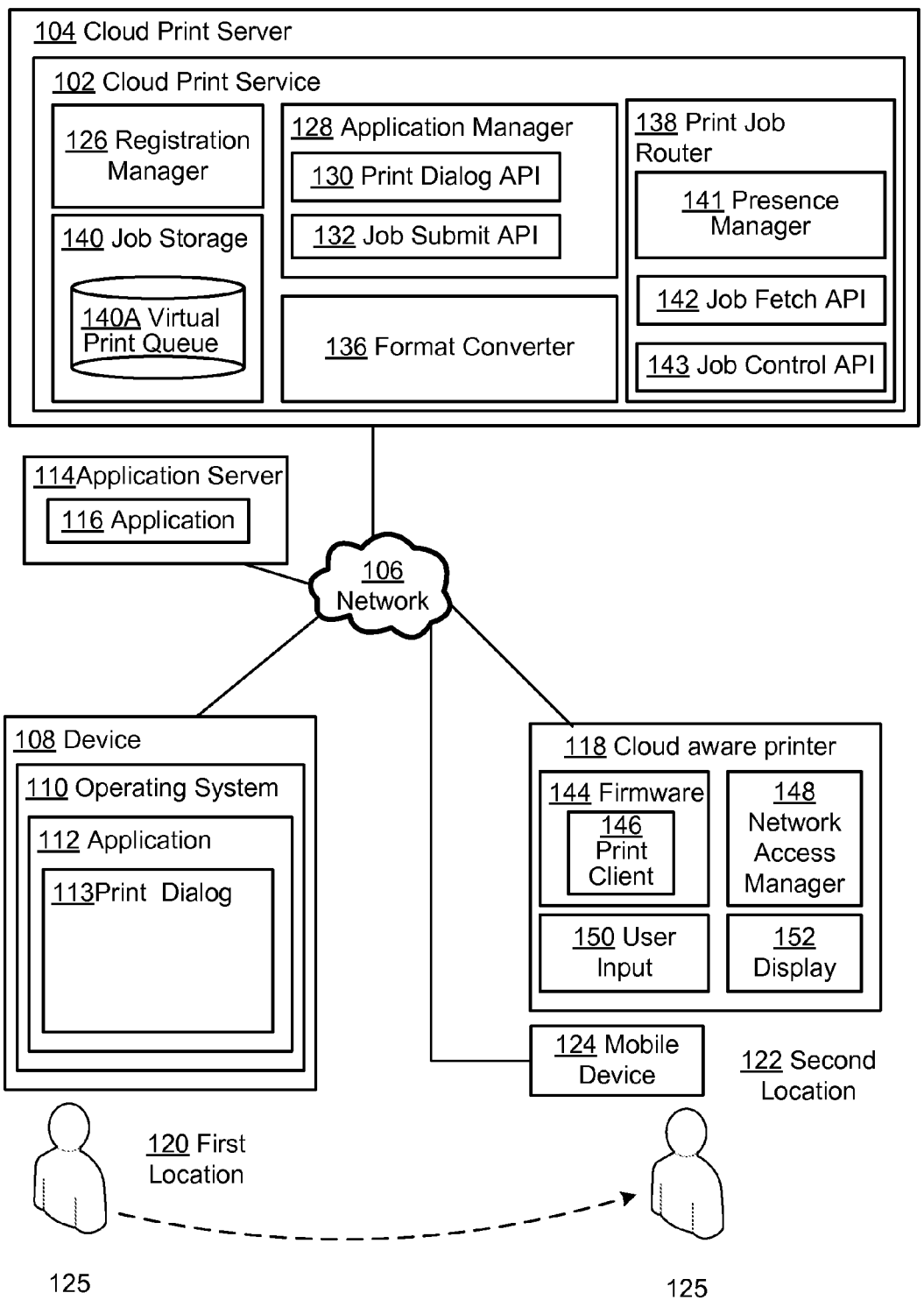
FIG. 1 is a block diagram of a system for remote printing management using a cloud print service.

FIG. 1 is a block diagram of a system 100 for implementing remote printer management using a cloud print service 102. As shown in the example of FIG. 1, the cloud print service 102 may be executed on a cloud print server 104 which provides printing capabilities over a network 106. As described herein, the cloud print service 102 therefore provides a user with a uniform printing experience which is platform-independent and which unburdens the user of the need to configure, update, or otherwise maintain or oversee printer operations. Moreover, as also described herein in further detail, the cloud print service 102 provides enhanced security against unauthorized and/or undesired uses of the cloud print service 102. For example, the system 100 prevents printer "spam" and other illegitimate uses. Various other features and advantages of the cloud print service 102 are described in detail below, and/or would be apparent.

In FIG. 1, a device 108 is illustrated as an example of virtually any computing device from which a user may wish to identify, designate, or submit a print job. By way of non-limiting example, then, the device 108 may include a laptop or desktop computer, a netbook, a tablet computer, a smartphone, a camera, or any device which may store or have access to data which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data which the user may wish to print, or combinations thereof.

In particular, as referenced above, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner or other provider of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system 100 of FIG. 1.

The network 106 may thus represent, for example, the public Internet or other wide area public or private network. The network 106 may represent, in further examples, a corporate or other intranet, and/or a smaller-scale, local or personal network, any of which (and/or combinations thereof) may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing.

In the context of the cloud-aware printer 118, the cloud print service 102 enables the application 112 to print directly to the cloud-aware printer 118, without a requirement or need for (e.g., independently of), involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 102 may make use of the cloud-aware printer 118, as described in detail, below.

For example, the cloud print service 102 may be configured to register the user and/or the device 108, as well as the cloud-aware printer 118. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer, not specifically illustrated in FIG. 1, which does not natively support communication with the cloud print service 102. When using such a legacy printer, a separate device and/or software may be utilized to impart the advantages of the cloud print service 102 to the legacy printer. It will be appreciated that all of the various features and functions of the cloud-aware printer 118 may be obtained through the use of a legacy printer supplemented with appropriate hardware/software support.

In short, the system 100 provides an ability for virtually any application running on any device within the network 106 (e.g., the applications 112, 116 and device 108) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

In particular, as referenced above, the system 100 may provide a number of enhanced features and functions related to remote printing management and the providing of enhanced security against unauthorized uses of the system 100. In the example of FIG. 1, the application 112 may provide a print dialog 113 in conjunction with the cloud print service 102. For example, as shown, the device 108 may be located at a first location 120, while the cloud-aware printer 118 may be located at a different, second location 122. Thus, a user 125 utilizing the device 108 at the first location 120 may select application content associated with the application 112 (and/or application 114) for printing, and may submit (an identification of) the application content to the cloud print service 102, along with a specific or generic reference to, or identification of, the cloud-aware printer 118.

In the example of FIG. 1, as referenced above, the user 125 may represent any user attempting to use the system 100 in an unauthorized or undesired manner. For example, the user 125 may be a user at the first location 120 who is prone to printing to the cloud-aware printer 118 at the second location 122, without actually travelling to the second location 122 to retrieve the resulting, printed documents (e.g., forgets to do so, or decides that the documents are no longer necessary after already having printed them).

In other examples, the user 125 may represent a more illegitimate user, who wishes to "spam" the cloud-aware printer with unsolicited marketing material. For example, the user 125 may be a seller of goods and services, and may print advertisements for such goods and services to the cloud-aware printer 118. In other examples, the user 125 may wish to propagate literature as part of a personal, political, or religious agenda, where such literature may be unrequested or undesired by other users of the cloud-aware printer 118.

In specific examples, the cloud-aware printer 118 may be one of a number of printers provided by a school or business (e.g., a hotel) for the use and enjoyment of associated students, customers, or other authorized users. However, if the user 125 obtains access to the cloud print service 102, e.g., by setting up a corresponding user account (e.g., a dummy or faked user account) as described in more detail, below, then the user 125 can theoretically send printings to all such cloud-aware printers being provided. For example, the user 125 might send a document to printers on every floor of a hotel, or to every printer in a school computer lab.

The risks of these and other, similar scenarios are arguably implicit in implementations of cloud-printing paradigms, particularly when the user 125 may be authorized for printing separately from, or independently of, a location of the user 125. That is, for example, in the example just given, the user 125 might be a user in a specific room in a hotel, or might be a user located across the world from the cloud-aware printer 118. Consequently, it is theoretically possible for the user 125 to implement a large number of printings at a large number of cloud-aware printers, with a relatively minimal amount of effort.

In the example of FIG. 1, however, the cloud print service 102 is configured to ensure that the user is physically present at the cloud-aware printer 118 before allowing printing to proceed. In this way, the user 125 may be less able and less likely to utilize the cloud-aware printer 118 in an unauthorized, inefficient, or otherwise undesirable fashion.

More specifically, the cloud print service 102 may provide a presence code and require that the user 125 submit the presence code in conjunction with a physical presence of the user 125 at the cloud-aware printer 118. Various examples for implementing the requirement for the physical presence of the user 125 at the cloud-aware printer 118 for printing to commence are provided below.

Figure 4:
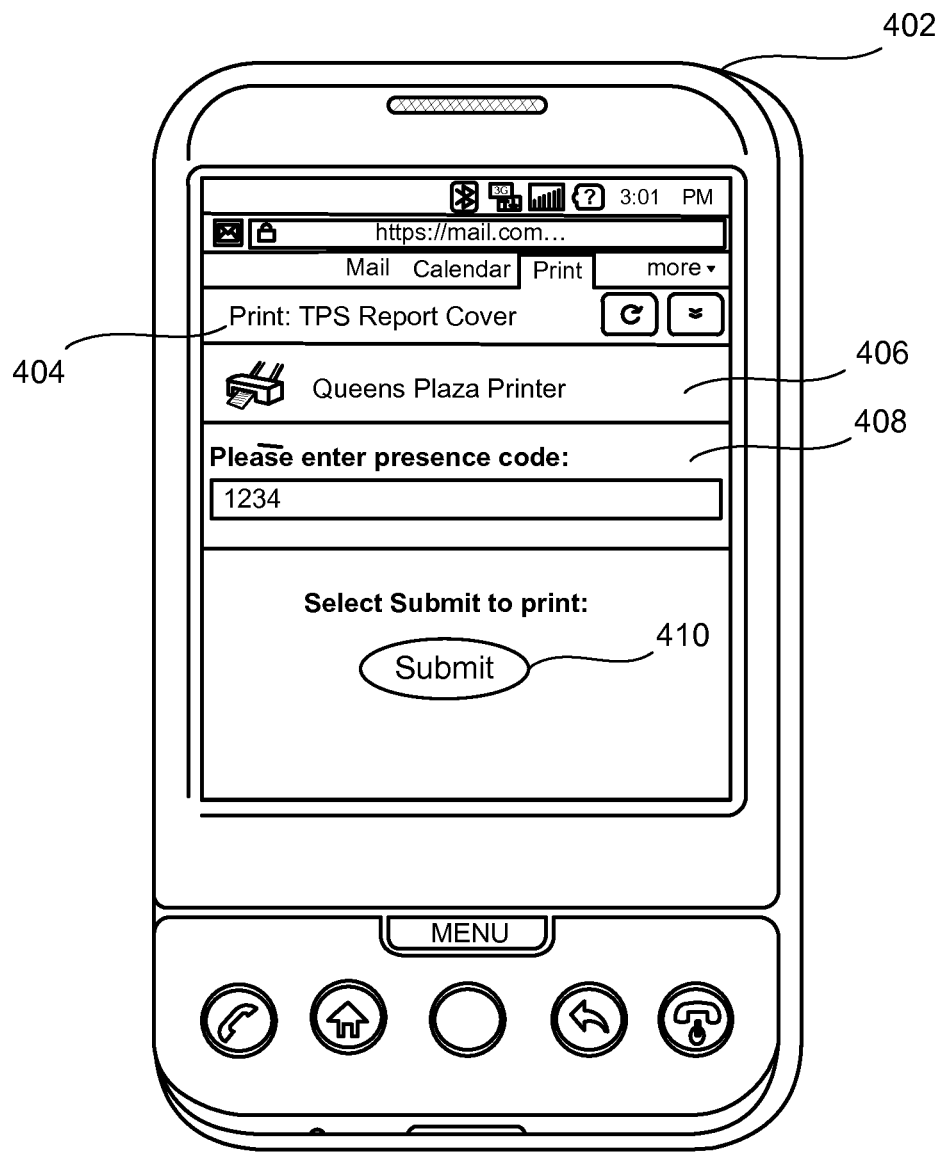
FIG. 4 is a screenshot illustrating example operations of the system of FIG. 1.

For example, in particular examples described in detail herein, e.g., with respect to FIG. 4, the user 125 may utilize a mobile device 124 at the second location 122 in order to submit the presence code and thereby initiate and execute the printing of identified documents by the cloud-aware printer 118. For example, as described, the user 125 may utilize the device 108 at the first location 120 to provide a submission of a print job identifying application content to be printed. The print job (e.g., the actual application content to be printed and/or a reference or other identifier to the application content) may be stored using the cloud print service 102, so that, at a later time, the user 125 may arrive at the second location 122 while carrying the mobile device 124.

Then, the cloud print service 102 may provide the presence code to the user 125. For example, the cloud print service 102 may email the presence code to the user 125 using the mobile device 124, and then require submission of the presence code using the cloud-aware printer 118, as described in detail, below. In other examples, the cloud print service 102 may use the cloud-aware printer 118 to provide the presence code, and then may receive the submission of the presence code by way of either the cloud-aware printer 118 and/or the mobile device 124. Various other techniques and examples for implementing and exchanging the presence code, not all of which require the mobile device 124, are provided herein, or would be apparent.

The mobile device 124 may include or represent virtually any device which may be carried by the user 125 while in transit, including, e.g., a cell phone, smartphone, tablet computer, netbook, notebook, or any such device. Thus, the mobile device 124 may include a wide range of possible feature sets, ranging from basic network connectivity all the way to providing full support for applications 112, 116, and browser-based support for communicating with the cloud print service 102 and/or the cloud-aware printer 118. In particular, it may be appreciated that, in various examples, the mobile device 124 may be the same device 108 used by the user at the first location 120, or it may be an entirely different device.

In any case, it may be appreciated that use of the mobile device 124 in the context of the system 100 may provide the user with a high degree of convenience and flexibility in utilizing and implementing the printing scenarios described herein. For example, it may be appreciated that the mobile device 124 may typically be familiar to the user 125, so that the user 125 experiences a uniform interface with the cloud print service 102 and/or the cloud-aware printer 118, even though the user may utilize a large number of varying types of printers represented by the cloud-aware printer 118 in the example of FIG. 1.

Further, it may be appreciated that, in such scenarios, since many required features for interacting with the cloud print service 102 and/or the cloud-aware printer 118 may be implemented using the mobile device 124, a minimal or substantially reduced feature set may be required at the cloud-aware printer 118 itself. That is, for example, the cloud-aware printer 118 may be manufactured with a minimal hardware/software set required for communicating with the cloud print service 102. In particular, as described in detail herein, use of the mobile device 124 may reduce or eliminate a need of the cloud-aware printer 118 to maintain data associated with authenticating the user 125 in the various authentication scenarios described herein. As a result, manufacturers of the cloud-aware printer 118 may be enabled to provide low cost printers which are nevertheless fully compatible with the printer scenarios described herein.

As shown in FIG. 1, the cloud print service 102 may include a number of example components or modules which may be utilized to implement functionalities of the cloud print service 102, and, in particular, may be utilized to implement the various remote printing management scenarios described herein. For example, the cloud print service 102 may include a registration manager 126, which may be configured to register printers and users. Thus, it may be appreciated that, through the use of the registration manager 126, the user 125 may register with the cloud print service 102, and may thereafter interact with the registration manager 126 to login to and utilize the cloud print service 102.

For example, the registration manager 126 may store a username and password of the user 125, which the user 125 may provide, e.g., in conjunction with the original print job submission identifying application content to be printed (i.e., using the device 108). Similarly, the user 125 may, in the example scenarios, use the same username/password to authenticate to the cloud print service 102 while present at the second location in attempting to initiate or otherwise consummate actual printing of the application content. In particular, as shown and described, the user 125 may utilize the mobile device 124 to provide the relevant username/password to the registration manager 126 for authentication of the user at the client print service 102, and to receive or provide the presence code.

Somewhat similarly, the cloud-aware printer 118, as well as various other printers (not specifically illustrated in the example of FIG. 1), may be registered with the registration manager 126. In the described examples, it may be appreciated that a particular subset of such printers, including the cloud-aware printer 118, may be associated with the user 125, and/or with one or more other users (including entities such as business or schools). That is, the registration manager 126 may register a plurality of users and a plurality of printers, and may associate various subsets of users with various subsets of printers, depending on associated authorizations or permissions, of the users/printers. For example, a given user may register a number of printers with a user account of the user. In other examples, a network administrator may associate a plurality of printers with a given user. In still other examples, the registration manager 126 may enable sharing of printers between users, so that, for example, a first user registered in association with the cloud-aware printer 118 may share the cloud-aware printer 118 with the user 125.

In some examples, users already may have a user account with a separate and possibly related service or service provider. For example, various online services (e.g., other cloud-based computing resources) may provide functionalities such as email, data storage, and document processing, and, in such cases, the user may already have a secure user account established in connection therewith. In such cases, the cloud print service 102 may leverage or access such existing user accounts, e.g., to avoid a need to create a new user account, and to facilitate access of existing users of other services with the cloud print service 102, such as, e.g., for implementation of the printer-sharing techniques just described.

Thus, it may be appreciated that although the registration manager 126 is illustrated as being included within the cloud print service 102, it also may occur that some or all functionality related to the registration manager 126 may exist externally to the cloud print service 102. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user 125 once the user 125 is logged on into the application 116.

Further in FIG. 1, an application manager 128 may be configured to communicate with any application which may be desired to be used for printing within the system 100, including, e.g., the application 112, and the application 116. Thus, for example, the application manager 128 may implement various application programming interfaces (APIs) which enable such communication with external applications.

For example, the application manager 128 may include a print dialog API 130, which may be configured to render the print dialog 113. A job submit API 132 may be utilized to receive the identification of application content submitted by the user 125 by way of the print dialog 113. The job submit API 132 may be configured to submit a corresponding print job, including application content to be printed and associated print characteristics, to a format converter 136, which may be configured to execute a conversion of the print job into a format which is consistent and compatible with the cloud-aware printer 118. For example, the job submit API 132 may receive a print job, and, to give a specific and non-limiting set of examples, a hypertext transfer protocol (HTTP) multi-part request which may include the printer capabilities expressed, e.g., in XPS, as well as a MIME type identifying the content type.

Thus, the application manager 128 may generally implement the functions of receiving a print request, and then receiving an associated print job, from, e.g., the application 112, 116. In general, the first function of a receiving a print request may include providing the user 125 with the print dialog 113 or other user interface with which the user 125 may select an available/associated registered printer, and/or as described herein, with which the user 125 may select a generic or currently unidentified printer. Receiving the print job may include receiving print data to be printed, possibly along with print characteristics characterizing preferences and other aspects of how their print data is desired to be printed (e.g., color versus black and white, paper size orientation, number of copies, or any other relevant or desired print characteristic). The application manager 128 may conduct other communications with the application 112, 116, as well, such as, e.g., providing a status of the printer of a print job during the print job.

Thus, it may be appreciated that the application manager 128 may communicate with the application 112, 116 (or other application) in a format that is independent of a specific printer, e.g., that is generic with respect to all available or relevant printers within the system 100. In this way, the application 112, 116 may be relieved of some or all of the burdens associated with needing knowledge of the destination printer when formulating and/or sending a print job.

For example, when sending the print job, the application 112 may formulate both the print data and print characteristics in the same manner, regardless of whether the print job is destined for a particular identified printer, or is merely identified or associated with a generic, as yet undetermined, printer. In fact, even if the user 125 does not currently have any registered printer associated with his or her user account, the print job still may be forwarded to the cloud print service 102 for storage, and for later printing to the cloud-aware printer 118 or other printer that ultimately may be registered to the cloud print service 102 in conjunction with the account of the user 125, and at a time of arrival of the user 125 at such a printer at the second location 122.

Thus, it may be appreciated that the various APIs (e.g., 130, 132) utilized by the application manager 128 and/or the applications 112, 116 may represent lightweight, consistent, customizable, and easily implementable APIs which may be utilized in conjunction with a large number of various types of applications. Moreover, such APIs may rarely, if ever, need to be updated or maintained by the user 125 in order for the user 125 to utilize the cloud print service 102 in conjunction with a particular application. Instead, such updates may be managed by an administrator or other provider of a cloud print service 102 and/or by a provider of the application 112, so that the user 125 is unburdened of associated efforts and responsibilities.

As referenced above, such print jobs received at the application manager 128 in the printer-independent or generic format, which may be specifically or generically identified with one or more printers, may be passed to the format converter 136, which may be configured to receive the print job and facilitate or execute conversion of the print job into a format associated with the designated (type of) printer for the print job in question. Such conversion may thus generally include, as needed, conversion of the print data itself, as well as conversion of the print characteristics specified in conjunction with the given print job.

In more detail, as is known, printers generally require low-level, device or type-specific instructions which provide a base by which printers actually apply ink to paper to achieve a desired appearance. Such instructions may therefore include very specific portrayals of the desired print outcome using, e.g., a page description language (PDL). For example, the language postscript may be used to describe a desired print outcome, which may then be rendered (e.g., or rasterized) by a specific printer using a print text or images. Additionally, fixed-layout document formats exist which are designed to facilitate device-independent printing all maintaining documents available. For example, the portable document format (PDF) is an example of such format, where .PDF documents may be generated using postscript. Somewhat similarly, the XML paper specification (XPF) provides such a fixed layout document, which is based on the eXtensible markup language (XML).

Thus, application content or other print data may be received from the application 112 in virtually any format, including, e.g., hypertext markup language (HTML), or in the format associated with document processing applications and/or images, or any PDF or XPF formats referenced above. The format converter 136 may thus be configured to receive print data in these and any other various formats, and to convert the print data into a format that is recognizable by a designated printer, e.g., that is recognizable by the cloud-aware printer 118 that is designated and identified by the user 125 upon the arrival of the user 125 at the second location.

Similarly, as referenced above, the format converter 136 may be configured to convert the print characteristics associated with the print job into a format that is recognizable by the designated printer 118. That is, as referenced above, the print characteristics may include aspects of how the print data should or can be printed; i.e., based on preferences of the user and/or (capabilities, or lack thereof) of the designated printer. For example, a given printer may be a black and white printer with no two-sided printing abilities, while a second printer may be a color printer with two-sided printing. The format converter 136 may thus provide appropriate conversion, depending on a selected printer and/or on preferences of the user 125. The format converter 136 may then provide and execute a resulting, converted print job using, e.g., a protocol referred to herein as the cloud print protocol (CPP). Thus, the cloud print protocol allows the cloud print service 102 to communicate with the cloud-aware printer 118 (or with a legacy printer enabled to communicate with the cloud print service 102).

As may be appreciated from the above description, the cloud print service 102 may include job storage 140 which may provide one or more types of data storage related to operations of the cloud print service 102. For example, the job storage 140 may store print jobs and related information, where such print jobs/information may be stored prior to and/or after the format conversions provided by the format converter 136. For example, a print job may be stored in a printer-independent format in which the print job may have been received by the job submit API 132.

In the example of FIG. 1, the job storage 140 may include a virtual print queue 140A which is specifically configured to receive and store print jobs from the device 108 which are designated for roving printing at a time of submission of the print job, e.g., when the user 125 is not necessarily aware of a location or identify of the cloud-aware printer 118 when submitting the relevant print job. For example, the user 125 may utilize the print dialog 113 to select the virtual print queue 140A. That is, the virtual print queue 140A may be represented within a provided printer list. In this way, as described, the user 125 may simply select the virtual print queue 140A, to thereby identify the associated print job within the job storage 140, so that the user 125 may retrieve the identified print job from the virtual print queue 140A upon arrival at the second location 122.

Thus, for example, it may be observed that print jobs of the user 125 may be stored in conjunction with the associated user account of the user 125, and in conjunction with one or more printers registered to that user and/or in conjunction with the virtual print queue 140A. As a result, print jobs may be committed to short term or long term storage, so that, for example, the user 125 may locate, identify, and re-print desired print jobs even if the user 125 later accesses the cloud print service 102 from a different location (e.g., the second location 122) and/or using a different device than the device 108.

Further, it may be observed that conversion of the print job at least partially occurs at separate devices from the one or more devices in which the originating application 112, 116 may itself be executing. In this way, for example, it is possible to formulate and submit a print job at least partially separately from a conversion of the print job into a printer-specific format, and to thereby divorce such conversion from an underlying operating system of the executing application, e.g., the operating system 110.

Further in the example of the cloud print service 102 of FIG. 1, a print job router 138 may be configured to route the converted print job from the format converter 136 and/or the job storage 140 to a designated printer, e.g., the cloud-aware printer 118. The print job router 138 may further be configured to monitor and mediate execution and success/failure of a given print job. The print job router 138 may thus be responsible for managing and monitoring ongoing print jobs from a plurality of users, including the user 125, which may be designated for a corresponding plurality of printers, including the cloud-aware printer 118.

As shown, the print job router 138 may include or otherwise be associated with a job fetch API 142 and/or a job control API 143. For example, the job fetch API 142 may be configured to provide the print job to the cloud-aware printer 118, e.g., may be used by the cloud-aware printer 118 to fetch a desired print job, e.g., a print job specified from within the virtual print queue 140A, or, in other embodiments, a next available print job for the cloud-aware printer 118.

The job control API 143 may be responsible for authorizing the cloud-aware printer 118 as needed, and for receiving updated status information from the cloud-aware printer 118, e.g., whether the print job has completed or failed. Such status information also may be stored using the job storage 140, in association with the corresponding print job in question. The job control API 143 also may include status information including, e.g., whether a print job is currently queued by not yet downloaded to a corresponding printer, or spooled/downloaded and added to a native printer queue of the cloud-aware printer 118 (if applicable).

Further, a presence manager 141 is illustrated which may be configured, as referenced above, to require a physical presence of the user 125 at the second location 122 of the cloud-aware printer 118, before proceeding with the above-referenced techniques for implementing cloud printing. As also referenced, a number of techniques may be implemented by the presence manager 141 to ensure physical presence of the user 125 at the cloud-aware printer 118 before enabling the print job router 138 to proceed with executing the corresponding printing.

For example, some such techniques may utilize only hardware/software available on the cloud-aware printer 118, without requiring the mobile device 124. In other example implementations, the presence manager 141 may utilize combinations of the mobile device 124 and the hardware/software of the cloud-aware printer 118. In these regards, it may be appreciated that such variations in how the presence manager 141 may be implemented may be configured by an administrator of the cloud print service 102, and/or, to an extent, by the user 125.

That is, for example, an administrator may be responsible for determining whether to activate the presence manager 141 or not. Then, the administrator may configure the same presence assurance techniques for all users, or may configure different presence assurance techniques for particular users or classes of users, and/or enable users to select from among available techniques. In other examples, the availability of such techniques may vary with respect to the user 125 and/or the cloud-aware printer 118. For example, the user 125 may not be in possession of a functioning mobile device 124, and/or the cloud-aware printer 118 may have a limited subset of the possible hardware/software which might be used by the presence manager 141. In such scenarios, the presence manager 141 may be configured, either statically or dynamically, to utilize available computing/printing resources to continue to ensure the physical presence of the user 125 at the cloud-aware printer 118 at the time of printing.

As just referenced, the cloud-aware printer 118 may utilize various hardware/software components during normal printing operations, and/or in conjunction with operations of the presence manager 141. For example, during execution, the print job router 138 may be configured to communicate with, e.g., a print client 146 executing on firmware 144 of the cloud-aware printer 118. The print client 146 may communicate with the cloud print service 102, e.g., with the print job router 138, using the cloud print protocol referenced herein.

More specifically, the print client 146 may be configured to register the cloud-aware printer 118 with the cloud print service 102, and to thereby associate the thus-registered printer 118 with a user of the device 108, e.g., the user 125 (e.g., either individually or as part of a class of users 125, such as all hotel guests or all employees of a business or students of a school). Moreover, the print client 146 may be configured to actually drive the cloud-aware printer 118 and thereby execute the desired printing.

In the example of FIG. 1, the cloud-aware printer 118 is illustrated as including the print client 146 within the firmware 144. The firmware 144, as would be appreciated by one of skill in the art, may represent factory installed hardware and/or software which provides designated functions without generally requiring or allowing user modification or configuration (e.g., may utilize read-only memory). Thus, the cloud-aware printer 118 may be preconfigured from before time of purchase to communicate and coordinate with the cloud print service 102, to thereby provide a convenient and enjoyable user experience.

For example, the cloud-aware printer 118 may include a network access manager 148, user input 150, and a display (or other user output) 152, which may generally represent otherwise-conventional components that are therefore not described here in detail except as may be needed to assist in understanding example operations of the system 100. Of course, the cloud-aware printer 118 need not include all of the components 144-152, and/or may include additional or alternative components, which are also not discussed here in detail.

In the example of FIG. 1, the network access manager 148 may represent associated hardware/software which enables a cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to an appropriate router.

The user input 150 may represent virtually any sort of keypad, stylus, or other input technique for entering data to the cloud-aware printer 118. Similarly, the display 152 may represent virtually any sort of audio and/or video display to output information to the user 125 or other user of the cloud-aware printer 118.

It will be appreciated that many other configurations of the cloud-aware printer 118 or other printers are contemplated for use in conjunction with the system 100. For example, as referenced above, a legacy printer, not specifically illustrated in the example of FIG. 1, may lack some of the functionality of the cloud-aware printer 118. For example, such a legacy printer may not have the network access manager 148 and/or the firmware 144 which may be utilized to implement the print client 146 and otherwise communicate with the cloud print service 102. In such cases, the print client 146 may be configured to execute on or in conjunction with a computing device which is in communication with the legacy printer, and which has the available resources necessary to implement the functionalities described herein, and which may include an otherwise conventional printer driver communicating with the legacy printer in question. Other variations and implementations of the printer 118 or related printers would be apparent, and are not described here in detail, except as may be necessary or helpful in understanding operations of the roving printer scenarios described herein.

Thus, in various example scenarios, the presence manager 141 may utilize only the user input 150 and display 152 of the cloud-aware printer 118 in ensuring the presence of the user 125 at the second location at the time of printing. For example, after receiving a print job from the user 125 and associating the print job with the printer 118, the presence manager 141 may generate a presence code and provide the presence code to the user 125 by way of the display 152, e.g., in response to a request therefor by the user 125 submitted by way of the user input 150.

In other example scenarios, the user 125 may submit a print job using the mobile device 124, and by the same action may at that time initiate the actual printing of the selected document. Thus, in response, the presence manager 141 may receive the print submission/initiation, and may generate the presence code for the associated document/printer and send the presence code to the user 125, e.g., by emailing the presence code to the mobile device 124. Then, the user 125 may enter the thus-received presence code at the second location 122, e.g., using the user input 150 of the cloud-aware printer 118.

In existing cloud print printing scenarios, users may submit print jobs for immediate initiation of printing, or may submit print jobs at a first time and actually initiate printing thereof at a second time. For example, as referenced above, the virtual print queue 140A may be used in the latter scenarios, since the user 125 may submit a print job for storage in the virtual queue 140A and then later initiate printing thereof upon arrival at the cloud-aware printer 118. However, in any of these scenarios, without the presence manager 141, it may be possible for the user to print documents to the cloud-aware printer 118 without being physically present.

For example, in scenarios in which print submission and initiation happen simultaneously, the user 125 may simply sign up or register with the cloud print service 102, and then submit print jobs for immediate printing at all available/allowed printers. Moreover, even in the scenarios in which the virtual print queue 140A is used (e.g., in which submission of the print job is divorced from a later initiation of the print job), the user 125 may utilize the mobile device 124 to initiate printing without being physically present at the cloud-aware printer 118.

However, in the example of FIG. 1, the presence manager 141 may be configured to use one or more of a variety of techniques to ensure the physical presence of the user 125 at the cloud-aware printer 118 at a time of printing. For example, the presence manager 141 may generate or otherwise provide the presence code in conjunction with an identification of the cloud-aware printer 118 and of the associated print job itself.

Therefore, in order to submit/initiate the print job in question for printing, the user 125 may be required to submit the presence code at the location 122 of the specific cloud-aware printer 118. Upon receipt, the presence manager 141 may be configured to validate the presence code and thereafter authorize the print job router 138 to proceed with printing in an otherwise-normal fashion.

Figure 2:
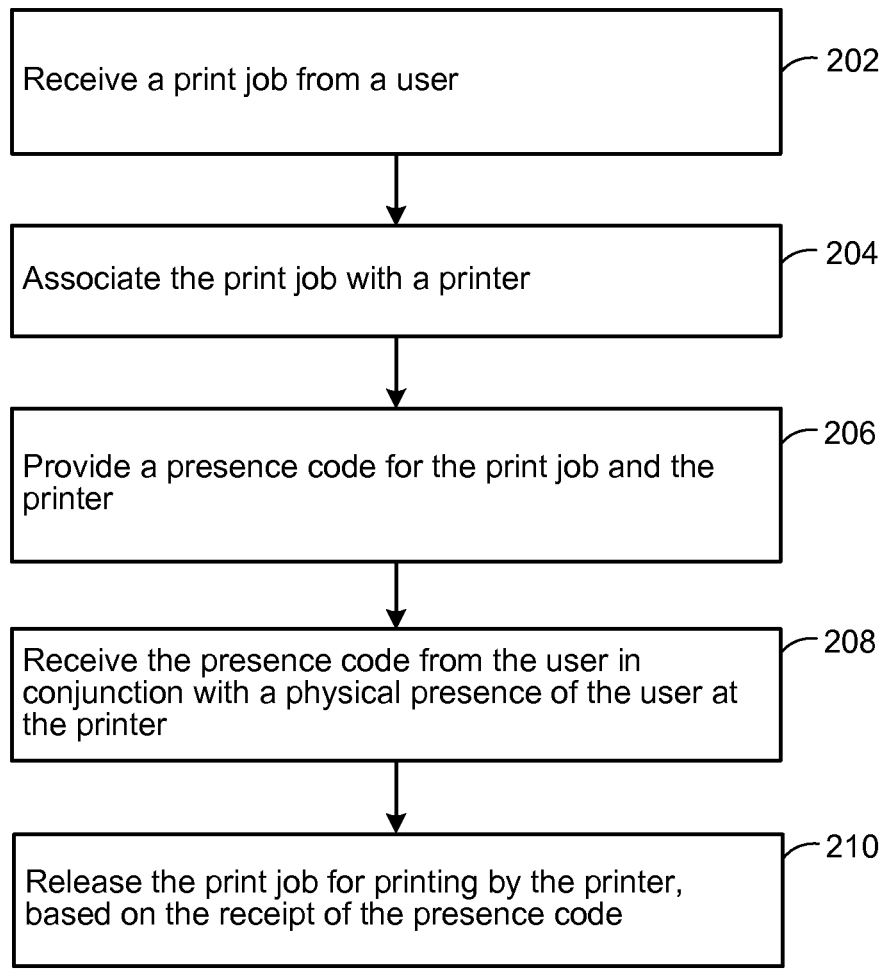
FIG. 2 is a flowchart illustrating example operations of the system of FIG. 1.

FIG. 2 is a flowchart 200 illustrating example operations 202-210 of the system of FIG. 1. Although the flowchart of FIG. 2 illustrates sequential, separate operations, it will be appreciated that such operations are merely for the sake of example, and that additional or alternative operations may be included. For example, operations of the flowchart 200 may be executed in different orders than that shown, and/or may be executed in partially overlapping or parallel manners, or in a nested, iterative, or looped fashion. Further, additional or alternative operations may be included, and/or one or more operations may be omitted.

In the example of FIG. 2, a print job may be received from a user (202). For example, the application manager 128 of the cloud print service 102 may receive a print job from the user 125, submitted using the application 112 running on the device 108.

The print job may be associated with a printer (204). For example, the application manager 128 may identify the cloud aware printer 118 based on a selection thereof by the user 125 using the print dialogue 113.

A presence code may be provided for the print job and the printer (206). For example, the presence manager 141 may generate an alpha-numeric presence code which is uniquely associated with the print job and the cloud aware printer 118. As described, the presence manager 141 may transmit the presence code to the cloud aware printer 118, whereupon the cloud aware printer 118 may output the presence code, e.g., either by printing a sheet of paper containing the presence code, or by displaying the presence code using an available display 152. In other example implementations, the presence manager 141 may transmit the presence code to the mobile device 124 of the user 125. However, as referenced above and described in more detail below with respect to FIG. 3, the presence manager 141 may provide the presence code in a manner which ensures a physical presence of the user 125 at the cloud aware printer 118 when executing the print job in question.

Consequently, the presence code may be received from the user in conjunction with a physical presence of the user at the printer (208). For example, the presence manager 141 may receive the presence code from the user 125 by way of the mobile device 124, or by way of the user input 150 associated with the printer 118.

The print job may be released for printing by the printer, based on a receipt of the presence code (210). For example, the print job router 138 may proceed with transmitting a printable file provided by the format converter 136 to the cloud aware printer 118 for printing thereby.

Figure 3:
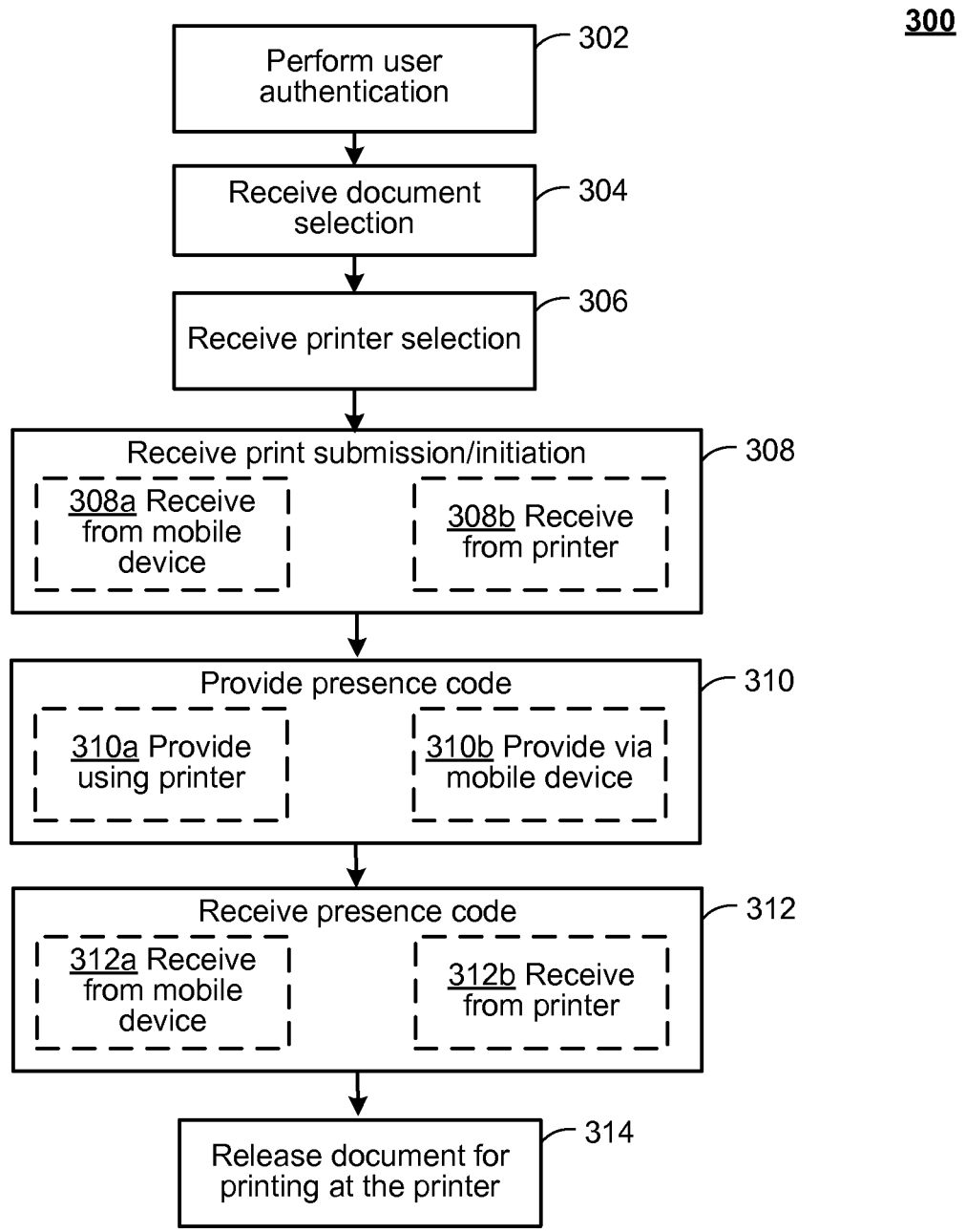
FIG. 3 is a flowchart illustrating more detailed examples of implementations of a cloud print service of FIG. 1 in print management scenarios.

FIG. 3 is a flowchart 300 illustrating more detailed example implementations of the system 100 of FIG. 1. In the example of FIG. 3, a user authentication may be performed (302). For example, it may be appreciated that the cloud print service 102 may be configured to provide various authentication services. For example, the registration manager 126 may be associated with techniques for authenticating the user 125. For example, the user 125 may authenticate with the cloud print service 102 using the device 108, the mobile device 124, or the cloud aware printer 118 itself, or combinations thereof.

More generally, it may be appreciated that the use of the cloud print service 102 and various other remote printing scenarios may enable such authentication of the user 125 in a manner which is independent of a physical presence of the user 125 with respect to the cloud aware printer 118. Consequently, it may be appreciated that the user 125 is enabled to authenticate with the cloud print service 102, and thereafter submit print jobs for printing, without being physically present at the second location 122 of the cloud aware printer 118.

It may be appreciated that although such authentication techniques, or variations thereof, may be implemented in conventional remote printing scenarios, such conventional printing scenarios typically occur in the context of closed networks, such as computer networks administered by a school or business. In such scenarios, user accounts are closely monitored and administered, to thereby curb abuses of printing privileges.

However, in cloud printing scenarios and related remote printing scenarios, the cloud print service 102 may be made available to the public, or to specify subsets or classes thereof. For example, as referenced herein, printing privileges may be extended to hotel guests, store patrons, or other visitors, consumers, or members of the public at large.

As a result, as referenced herein, such users may be more likely to abuse, or otherwise use in an undesired fashion, printing privileges provided by way of the cloud print service 102. For example, such uses may be more likely to print documents without actually retrieving the printed documents, either neglectfully or maliciously.

For example, in scenarios in which user accounts with the cloud print service 102 are provided to the public at large, users may simply set up a false or dummy account with the registration manager 126, and may thereafter proceed with printing unsolicited marketing materials, or otherwise utilizing the cloud aware printer 118 in an undesired manner. Somewhat similarly, such hotel guests and other members of the public who are provided with printing privileges in conjunction with some other business or consumer relationship may be more difficult to monitor, and may therefore be more willing and more likely to abuse the printing privileges that are provided.

Still further, although FIG. 3 illustrates an example in which user authentication is performed, it may be appreciated that malicious users may attempt to directly circumvent any authentication requirements. In such cases, a may occur that no authentication techniques are implemented before the user 125 attempts printing. In similar or related scenarios, it may occur that the user 125 obtains authentication credentials of another user, and thereafter attempts to utilize the authentication credentials in conjunction with malicious or otherwise undesired printing.

A document selection may be received (304), in conjunction with receipt of a corresponding printer selection (306). For example, the print dialogue API 130 may receive identification of a document of the application 112 and of the cloud aware printer 118 by way of the print dialogue 113.

A print submission/initiation may be received (308). In this regard, it may be appreciated that a submission of a print job may refer to, or include, completion of use of the print dialog 113 and subsequent transmission of the print job and related print characteristics to the application manager 128. In many cases, such a submission may also constitute an actual initiation of operations associated with commencing printing at the cloud aware printer 118.

However, in various other example scenarios, it may occur that the submission of the print job occurs separately and independently from a subsequent initiation of actual printing. For example, as referenced above, the user 125 may initially execute a submission of a print job using the computing device 108 and designating the virtual print queue 140A, so that the print job is submitted without reference to a specific, actual printer. At a later time, the user 125 may separately execute a print initiation, during which the print job stored at the virtual print queue 140A may be retrieved for actual printing thereof. As described, such separate print initiation may be executed using, e.g., the mobile device 124 and/or the user input 150 of the cloud aware printer 118.

Nonetheless, it may be appreciated that even in scenarios in which the user 125 uses the virtual print queue 140A to provide the print submission separately from the print initiation, the user 125 may, in theory, and without operation of the presence manager 141, utilize the mobile device 124 to initiate remote, undesired printing. However, as described herein, operations of the presence manager 141 may ensure that such undesirable printing does not occur, by ensuring that the user 125 is physically present at the second location 122 of the cloud aware printer 118 when the printing is executed.

Thus, it may be appreciated from the above that receipt of the print submission and/or initiation may occur by way of the mobile device 124 (308a) and/or the user input 150 of the cloud aware printer 118 (308b). Of course, these are merely examples, and submission and/or initiation of print jobs may occur through various other techniques, as well. For example, the user 125 may utilize the computing device 108, or other suitable means.

A presence code may then be provided (310). For example, as referenced above, the presence manager 141 may generate an alpha-numeric presence code which is uniquely associated with the print job and with the cloud aware printer 118. The presence manager 141 may provide the presence code using the display 152 of the printer 118 (310a), and/or by way of the mobile device 124 (310b).

The presence manager 141 may provide the presence code in a variety of different manners, or combinations thereof. For example, the presence manager 141 may generate the presence code in association with a time to live (TTL), so that the validity of the presence code expires after a predetermined time.

In other example implementations, the presence manager 141 may provide the presence code in association with an identifier that is present at the cloud aware printer 118, so that the user 125 may be required to be present at the cloud aware printer 118 in order to observe or otherwise utilize the identifier. For example, the presence code may specify a particular visual feature which is located at the second location 122. In related examples, the presence code may be required to be submitted in conjunction with a quick review (QR) code provided at or on the cloud aware printer 118.

In still further implementation examples, the presence manager 141 may utilize a GPS signal associated with the mobile device 124, or may otherwise use location tracking techniques to ensure presence of the user 125 at the second location 122. In such contexts, it may be appreciated that the use of such location tracking techniques may be implemented in conjunction with explicit agreement and approval received from the user 125, and/or in conjunction with an independent requirement for the use of such location tracking techniques which may be instituted by an employer or other entity associated with the user 125 (and with the permission of the user 125).

Thus, the presence code may be received from the user 125 (312) in conjunction with the physical presence of the user 125 at the second location 122 of the cloud aware printer 118. For example, the presence code may be received by way of the mobile device 124 (312a), and/or by way of the printer 118 (312b).

In this regard, it may be appreciated that the various operations 308, 310, 312 (and sub-operations thereof) may be conducted in a variety of combinations. For example, operations 308, 310, 312 may be implemented using sub-operations 308b, 310a, 312b. In other examples, operations may proceed according to sub-operations 308a, 310b, 312b, or, in still other examples may proceed according to sub-operations 308b, 310b, 312b.

More generally, it may be appreciated that implementations utilizing only the mobile device 124 (e.g., 308A, 310B, 312A) may, by themselves and without additional requirements as described herein, be insufficient to ensure the physical presence of the user 125 at the second location 122, since the user 125 may theoretically utilize the mobile device 124 at any location to complete operations necessary to execute printing. Consequently, it may be appreciated that the presence manager 141 may implement one or more algorithms for selecting from among the sub-operations of the operations 308-312 to thereby ensure the physical presence of the user 125 at the cloud aware printer 118.

For example, the presence manager 141 may implement such algorithms in a manner which is dependent upon an initial receipt of submission of the print job by the user 125, so as to ensure inclusion of at least one operation at which the user 125 is physically present at the second location 122. In other words, for example, the presence manager 141 may determine that if a print initiation is received from the mobile device 124, then providing and/or receiving of the presence code should be implemented using input/output features of the printer 118. However, if the presence manager 141 receives the initial submission/initiation from the printer 118, then the presence manager 141 may be permitted to utilize the mobile device 124 when providing and/or receiving the presence code. In all such cases, as described herein, the presence manager 141 may be configured to implement such algorithms in a manner which ensures physical presence of the user 125 at the second location 122 during a time of printing of the print job in question.

Consequently, the print job router 138 may be permitted to release the received document for printing of the printer 118 (314). Thus, the system 100 may ensure that malicious or otherwise undesirable printing on the part of the user 125 is substantially reduce or eliminated.

Although the specific example of FIG. 3 illustrates operations 302-314 as separate, sequential operations, it may be appreciated that, as described above with respect to FIG. 2, FIG. 3 represents merely a set of possible example implementations, and that many other example embodiments may be implemented. In such embodiments, consequently, it may occur that the various operations 302-314 occur in a different order than that shown, or include greater or fewer operations than those shown, or occur in a partially or completely overlapping or parallel manner.

For example, it may occur that the operations 304, 306, 308, or portions thereof, occur as a single operation, such as when the user 125 selects a document and printer using the print dialogue 113 and thereafter submits all relevant information in a single action.

In other example implementations, it may occur that the presence manager 141 provides the presence code to the user 125 in a more indirect fashion. For example, the presence code may be provided to the user 125 through an intermediary, e.g., a hotel desk clerk or other representative of a business or other entity providing printing privileges to the user 125. In such scenarios, as referenced above, the presence code may be associated with a time limit for validity thereof. For example, the presence code may be valid for a period of an hour, a day, or other appropriate time period.

In other example implementations, it may occur that the cloud aware printer 118 may lack some or all of the various input/output functionality described above with respect to the cloud aware printer 118. In these and other example scenarios, a kiosk or other computing terminal may be provided in a vicinity of the cloud aware printer 118 at the second location 122. In such scenarios, it may be appreciated that many or all of the various features described above with respect to the cloud aware printer 118 may be implemented in conjunction with the kiosk or other computing terminal.

Further, in these and other example scenarios, it may be appreciated that various other technologies, not specifically described above, may be utilized to implement the various features and functions that are described and illustrated above. For example, the various interactions described above with respect to the user 125, the devices 108/124, and the cloud aware printer 118 may be conducted using, e.g., near field communication (NFC) techniques, Bluetooth, Infrared, network, or various other technologies and related protocols.

FIG. 4 illustrates a mobile device 402 and associated screenshots associated with example implementations of the system 100 of FIG. 1. In the example of FIG. 4, a print job for a document named "TPS Report Cover" is identified with a print tab of a graphical user interface provided by the cloud print service 102. Further in the example of FIG. 4, a portion 406 identifies a printer "Queens Plaza printer" selected for printing of the associated print job.

As shown, a portion 408 may include a text entry field and a corresponding request or requirement for entry of a corresponding presence code. Thus, as may be appreciated from the above description of FIGS. 1-3, it may occur that the user 125 is present at the second location 122 of the cloud aware printer 118, and may therefore have received the presence code by way of, e.g., a printed page, the display 152, a display of a nearby kiosk or other terminal, or, in some implementations as described, from an email or text message sent by the presence manager 141 and received using the mobile device 402 itself. Consequently, as shown, a submit button 410 may be selected in order to submit printing of the document "TTS Report Cover" in conjunction with a physical presence of the user 125 at the second location 122.

Although the example of FIG. 4 illustrates the portion 404-410 within a single view of the mobile device 402, it may be appreciated that the various portions 404-410 may be implemented in whole or in part using multiple screen views and/or using the input/output functionality of the cloud aware printer 118. Consequently, it may be appreciated that the various example implementations of FIGS. 1-4 may be utilized to provide many different scenarios for ensuring the physical presence of the user 125 at the second location 122 when executing a specified print job. Consequently, opportunities for abuse of printing privileges by the user 125 may be reduced or eliminated.

Figure 5:
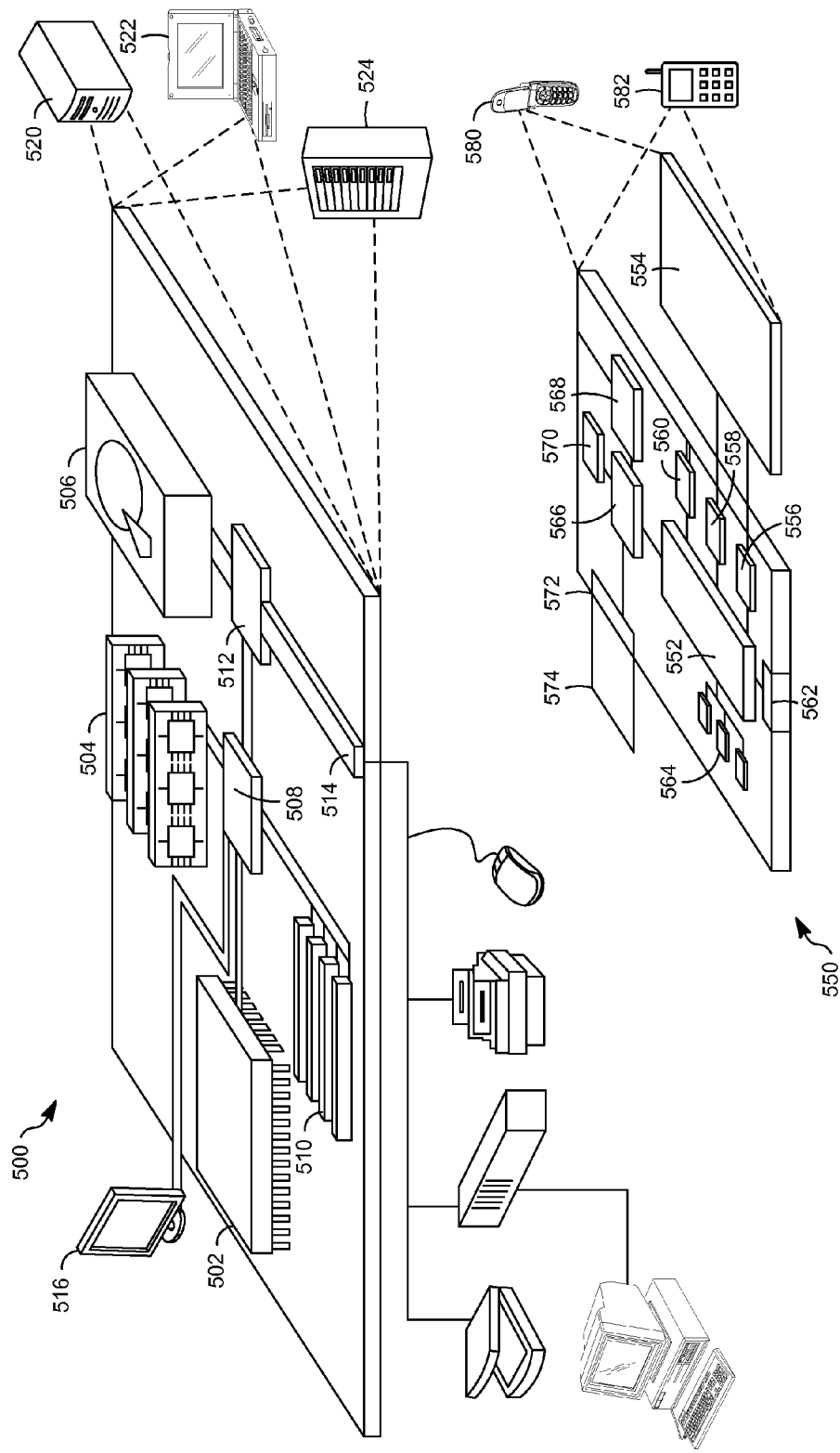
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A print system including instructions stored on a non-transitory computer-readable medium and executable by at least one processor, the print system comprising:

a registration manager configured to cause the at least one processor to receive registration information at a print server executing a cloud print service, and register a cloud-enabled printer with the cloud print service;

an application manager configured to cause the at least one processor to receive an authentication credential of a user, the print server configured to authorize the user to utilize the cloud print service with the cloud-enabled printer based on the authentication credential, the application manager configured to cause the at least one processor to provide a print dialog to the user in response to a print request, the print dialog providing a list of printers including the cloud-enabled printer for selection, the application manager configured to cause the at least one processor to receive a print job and associate the print job with the cloud-enabled printer, the print job designating the cloud-enabled printer and identifying content for printing;

a presence manager configured to cause the at least one processor to provide a presence code for the print job and the cloud-enabled printer, the presence manager configured to cause the at least one processor to determine an initial receipt of submission of the print job such that the initial receipt dictates a manner in which the presence code is submitted to the cloud print service, wherein, when the print job is initiated from a mobile device operated by the user, the initial receipt is determined as the mobile device, and the presence manager is configured to require that the presence code be submitted via an interface of the cloud-enabled printer, wherein, when the print job is initiated from the cloud-enabled printer, the initial receipt is determined as the cloud-enable printer, and the presence manager is configured to permit acceptance of the presence code via a presence code entry field of a print user interface of the mobile device, the presence manager configured to receive the presence code in the manner dictated by the initial receipt of submission of the print job; and a print job router configured to cause the at least one processor to release the print job for printing by the cloud-enabled printer, based on the receipt of the presence code.

2. The print server of claim 1, wherein the print server is configured to conduct the authorization of the user with respect to the cloud-enabled printer, independently of the physical presence of the user with respect to the cloud-enabled printer.

3. The print server of claim 1, wherein the presence manager is configured to set a time limit for the presence code in association with a time to live (TTL), after which a validity of the presence code expires.

4. The print server of claim 1, wherein the receipt of the presence code includes receipt of information characterizing a visual feature of an object located in an area of the cloud-enabled printer.

5. The print server of claim 1, wherein the application manager is configured to receive a subsequent print initiation and to configure the print job for printing and generate the presence code based thereon.

6. The print server of claim 1, wherein the application manager is configured to receive a print initiation from the cloud-enabled printer and to configure the print job for printing and generate the presence code based thereon.

7. The print server of claim 1, wherein the print job includes a first print initiation and a second print initiation, and the list of printers provided in the print dialog includes an unidentified printer that corresponds to a virtual queue at the print server, the application manager configured to receive the first print initiation that designates the unidentified printer, the application manager configured to temporarily store the print job in the virtual queue for later retrieval, the application manager configured to receive the second print initiation identifying the cloud-enabled printer at a later time after receiving the first print initiation, the print router configured to obtain the print job from the virtual queue and route the print job to the cloud-enabled printer.

8. The print server of claim 1, wherein the print server is configured to email the presence code to the user.

9. The print server of claim 1, wherein the print server is configured to transmit the presence code for output by the cloud-enabled printer.

10. A method for printing management in a cloud print system, the method being performed by at least one processor, the method comprising:
receiving registration information at a print server executing a cloud print service;
registering a cloud-enabled printer with the cloud print service;
authorizing a user to utilize the cloud print service with the cloud-enabled printer based on an authentication credential associated with the user;
providing a print dialog to the user in response to a print request, the print dialog providing a list of printers including the cloud-enabled printer for selection;
receiving a print job designating the cloud-enabled printer and identifying content for printing;
associating the print job with the cloud-enabled printer;
providing a presence code for the print job and the cloud-enabled printer;
determining an initial receipt of submission of the print job such that the initial receipt dictates a manner in which the presence code is submitted to the cloud print service,
wherein, when the print job is initiated from a mobile device operated by the user, the initial receipt is determined as the mobile device, and the presence code is required to be submitted via an interface of the cloud-enabled printer,
wherein, when the print job is initiated from the cloud-enabled printer, the initial receipt is determined as the cloud-enabled printer, and acceptance of the presence code is permitted via a presence code entry field of a print user interface of the mobile device;
receiving the presence code in the manner dictated by the initial receipt of submission of the print job; and
releasing the print job for printing by the cloud-enabled printer, based on the receipt of the presence code.

11. The method of claim 10 wherein providing the presence code comprises setting a time limit for the presence code in association with a time to live (TTL), after which a validity of the presence code expires.

12. The method of claim 10 wherein providing the presence code comprises transmitting the presence code to a computing terminal at a location of the cloud-enabled printer, for display thereby to the user at a time of printing, the computing terminal being separate from the cloud-enabled printer and the mobile device of the user.

13. A computer program product tangibly embodied on a non-transitory computer-readable medium and includes executable code that, when executed, is configured to cause at least one processor to:
receive registration information at a print server executing a cloud print service;
register a cloud-enabled printer with the cloud print service;
authorize a user to utilize the cloud print service with the cloud-enabled printer based on an authentication credential associated with the user;
provide a print dialog to the user, the print dialog providing a list of printers including the cloud-enabled printer for selection;
receive a print job designating the cloud-enabled printer and identifying content for printing;
associate the print job with the cloud-enabled printer;
provide a presence code for the print job and the cloud-enabled printer;
determine an initial receipt of submission of the print job such that the initial receipt dictates a manner in which the presence code is submitted to the cloud print service,
wherein, when the print job is initiated from a mobile device operated by the user, the initial receipt is determined as the mobile device, and the presence code is required to be submitted via an interface of the cloud-enabled printer,
wherein, when the print job is initiated from the cloud-enabled printer, the initial receipt is determined as the cloud-enabled printer, and acceptance of the presence code is permitted via a presence code entry field of a print user interface of the mobile device;
receive the presence code in the manner dictated by the initial receipt of submission of the print job; and
release the print job for printing by the cloud-enabled printer, based on the receipt of the presence code.

14. The computer program product of claim 13, wherein the presence code is associated with a time to live (TTL), after which a validity of the presence code expires.

15. The computer program product of claim 13, wherein the presence code is emailed to the user.

16. The computer program product of claim 13, wherein the presence code is transmitted to the cloud-enabled printer for output by the cloud-enabled printer.

* * * * *